United States Patent Office 3,499,002
Patented Mar. 3, 1970

3,499,002
1-CARBAMOYL-3-AROYLPYRROLIDINES
Grover Cleveland Helsley, Richmond, Va., assignor to A. H. Robins Company, Incorporated, Richmond, Va., a corporation of Virginia
No Drawing. Continuation-in-part of application Ser. No. 570,722, Aug. 8, 1966. This application June 20, 1968, Ser. No. 738,425
Int. Cl. C07d 27/06; A61k 27/00
U.S. Cl. 260—326.3    8 Claims

ABSTRACT OF THE DISCLOSURE

The invention relates to 1-carbamoyl-3-aroylpyrrolidines. The compounds are anticonvulsants. The compounds are prepared by reacting 3-aroylpyrrolidines with alkyl isocyanates, aryl isocyanates and N,N-diaryl carbamoyl halides.

---

The present invention relates to certain novel heterocyclic compounds which may be referred to as 3-aroylpyrrolidines, and is more particularly concerned with 1-carbamoyl-3-aroylpyrrolidines, compositions containing the same as active ingredients, and methods of making and using them.

This application is a continuation-in-part of my copending application Ser. No. 570,722, filed Aug. 8, 1966.

The invention is particularly concerned with 1-carbamoyl-3-aroylpyrrolidines represented by the following general structural formula:

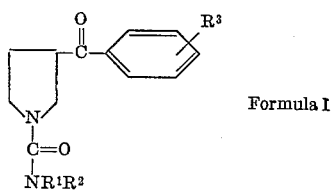

Formula I wherein:

$R^1$ and $R^2$ are each selected from the group consisting of hydrogen, lower alkyl, lower cycloalkyl, and aryl, and $R^3$ is selected from the group consisting of hydrogen, lower alkyl, halogen having an atomic weight less than 80 and trifluoromethyl.

The compounds of the invention having the foregoing Formula I have useful pharmacodynamic activity. More specifically, the compounds of this invention have anticonvulsant activity as measured by standard pharmacological procedures in animals. Exemplary of the activity shown by the compounds of this invention after intraperitoneal injection in mice is the abolition of the tonic extensor component of the seizure pattern against corneal stimulation using the recognized supramaximal electroshock seizure technique of J. E. P. Toman et al., J. Neurophysiol 9, 47 (1946).

The preferred compounds of the present invention and their $ED_{50}$ values expressed in terms of mg./kg. determined in mice by the procedure described hereinabove are as follows:

Example 4—$ED_{50}$ 88 mg./kg.
Example 5—$ED_{50}$ 100 mg./kg.
Example 10—$ED_{50}$ 75 mg./kg.
Example 6—$ED_{50}$ 80 mg./kg.

It is, accordingly, an object of the present invention to provide new and useful 1-carbamoyl-3-aroylpyrrolidines and methods of making the same. Other objects will be apparent to one skilled in the art and still others will become apparent hereinafter.

In the definition of the symbols in the foregoing Formula I and where they appear elsewhere throughout this specification the terms have the following significance:

The term "lower alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like.

The term "lower cycloalkyl" as used herein includes primarily cyclic radicals containing three up to nine carbon atoms inclusive and encompasses such groups as cyclopropyl, cyclobutyl, cyclohexyl, cyclopentyl, methylcyclohexyl, ethylcyclopentyl, cycloheptyl, and cyclooctyl.

An "aryl" radical refers to the unsubstituted phenyl radical or to a phenyl radical substituted by any radical or radicals which are not reactive or otherwise interfering under the conditions of reaction, such radicals including lower alkoxy, lower alkyl, trifluoromethyl, halo and the like. The aryl radicals have preferably no more than one to three substituents such as those given above and, furthermore, these substituents can be in the various available positions of the aryl nucleus and, when more than one substituent is present, can be the same or different and can be in various position combinations relative to each other.

An "aroyl" radical has the formula

The compounds of the invention are prepared by the following series of steps:

(1) A 1-benzyl-3-cyanopyrrolidine of the formula

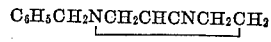

prepared as described in U.S. Patent 3,318,908 is reacted with a slight excess of an arylmagnesium halide of the formula Aryl—Mg—X wherein X is chlorine or bromine under the reaction conditions generally used when carrying out a Grignard reaction using anhydrous ether as the reaction medium and the reaction complex following the reaction period is decomposed using dilute caustic solution to give a 1-benzyl-3-aroylpyrrolidine.

(2) The 1-benzyl-3-aroylpyrrolidine of the formula

prepared as in Step 1 is then reacted with a slight excess of cyanogen bromide in a dry inert organic solvent, illustratively, chloroform; the solvent is evaporated after the reaction is completed and the residual 1-cyano-3-aroylpyrrolidine is hydrolyzed without further purification or isolation in refluxing 4 N hydrochloric acid to a 1-carbamoyl-3-aroylpyrrolidine which is within the scope of this invention as represented by Formula I given hereinabove.

(3) The 1-carbamoyl-3-aroylpyrrolidine of the formula

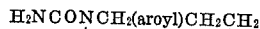

prepared as in Step 2 is hydrolyzed to a 3-aroylpyrrolidine by prolonged refluxing for a period of about 48 hours to about 72 hours, using concentrated hydrochloric acid. In a modified procedure the 3-aroylpyrrolidines can be obtained directly from the residual 1-cyano-3-aroylpyrrolidines prepared as in Step 2 by refluxing the material in concentrated hydrochloric acid for periods up to 72 hours.

(4) The 3-aroylpyrrolidines of the formula

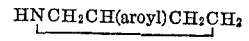

prepared as in Step 3 are then reacted with various reactants including lower alkyl isocyanates, aryl isocyanates, N,N-lower alkyl carbamoyl halides, and N,N-diaryl carbamoyl halides to give the novel compounds of the present invention embraced by Formula I.

The foregoing is a general description of how to prepare the compounds of this invention. The following examples illustrate the preparation of specific compounds but should not be construed as a limitation of the scope of the invention set forth in Formula I.

EXAMPLE 1

1-benzyl-3-benzoylpyrrolidine hydrochloride hydrate

To a stirred solution of 544 g. (3.0 moles) of phenylmagnesium bromide in 1.5 liters of dry ether was added 279 g. (1.5 moles) of 1-benzyl-3-cyanopyrrolidine in 400 ml. of dry ether at a rate which maintained gentle refluxing. The mixture was stirred for two hours at room temperature after the addition was complete, cooled and treated with 151 g. (3.0 moles) of ammonium chloride in 900 ml. of water. After the ether was evaporated the aqueous suspension was heated on a steam bath for several hours to insure hydrolysis of the ketimine. The mixture was then extracted with ether and the combined extracts were washed with water and dried over magnesium sulfate. The solvent was evaporated and the residual oil distilled at reduced pressure. The light yellow oil boiling at 172–175° C./.08 mm. weighed 210 g. (53% yield). A portion of the free base (6 g.) was treated with 3 N HCl and the white crystalline hydrochloride which formed was recrystallized from water. The salt weighed 2.6 g. and melted at 116–118.5° C.

*Analysis.*—Calculated for $C_{18}H_{22}NO_2Cl$ (percent): C, 67.59; H, 6.93; N, 4.38. Found (percent): C, 67.85; H, 6.94; N, 4.42.

EXAMPLE 2

1-benzyl-3-(m-trifluoromethylbenzoyl)-pyrrolidine hydrochloride

To a stirred Grignard solution prepared from 32.4 g. (1.3 moles) of magnesium, 300 g. (1.3 moles) of m-bromobenzotrifluoride in 450 ml. of ether was added 186 g. (1.0 mole) of 1-benzyl-3-cyanopyrrolidine in 200 ml. of dry ether at a rate which maintained gentle refluxing. The mixture was stirred at reflux for one hour, cooled and treated with a solution of 70 g. (1.3 moles) of ammonium chloride in 600 ml. of water. After the ether was evaporated, the mixture was heated for one hour on a steambath to insure hydrolysis of the ketimine. The mixture was extracted with ether and the combined extracts were washed with water, dried over magnesium sulfate and the solvent evaporated. The residual oil was distilled at reduced pressure and the fraction boiling at 165–167° C./.07 mm. collected. The light yellow oil weighed 123 g. (37% yield). A portion (23 g.) of the product was redistilled slowly and the fraction boiling at 148–150° C./.04 mm. collected. The oil weighed 16 g. A portion (10 g.) of the oil was dissolved in ether and treated with ethereal hydrogen chloride. The white hydrochloride which formed melted at 158–160.5° C. and weighed 9.8 g. after it was recrystallized from methyl ethyl ketone.

*Analysis.*—Calculated for $C_{19}H_{19}NOClF_3$ (percent): C, 61.70; H, 5.18; N, 3.79. Found (percent): C, 61.75; H, 5.15; N, 3.99.

EXAMPLE 3

1-benzyl-3-(p-fluorobenzoyl)-pyrrolidine hydrochloride

To a stirred Grignard solution prepared from 42.5 g. (1.76 moles) of magnesium, 308 g. (1.76 moles) of p-fluorobromobenzene in 700 ml. of ether was added 164 g. (0.88 mole) of 1-benzyl-3-cyanopyrrolidine in 100 ml. of dry ether at a rate which maintained gentle refluxing. The mixture was stirred for one hour at ambient temperature, cooled and treated with a solution of 94 g. (1.8 moles) of ammonium chloride in 500 ml. of water. The resulting suspension was stirred and heated on a steam bath for 16 hours, cooled and treated with 500 g. of 50% NaOH. Toluene was added to the flash and the mixture was heated for one hour on a steam bath to insure hydrolysis of the ketimine. The suspension was filtered and the cake washed with toluene. The organic layer was separated, washed with water and dried over magnesium sulfate. The solvent was evaporated and the residual oil was distilled at reduced pressure. The fraction boiling at 169–170° C./.05 mm. weighed 103 g. (41% yield). A portion of the free base (7.6 g.) was dissolved in isopropyl ether and treated with ethereal hydrogen chloride. The salt weighed 5.3 g. and melted at 163–165° C. after it was recrystallized from an isopropanol-isopropyl ether mixture.

*Analysis.*—Calculated for $C_{18}H_{19}ClFNO$ (percent): C, 67.60; H, 5.99; N, 4.38. Found (percent): C, 67.82; H, 5.95; N, 4.54.

Utilizing the process of Example 3 above, the following compounds are prepared from the stated starting materials:

1-benzyl-3-(p-ethylbenzoyl)-pyrrolidine by reacting 1-benzyl-3-cyanopyrrolidine and p-ethylphenylmagnesium bromide.

1-benzyl-3-(p-chlorobenzoyl)-pyrrolidine by reacting 1-benzyl-3-cyanopyrrolidine and p-chlorophenylmagnesium bromide.

EXAMPLE 4

3-benzoyl-1-carbamoylpyrrolidine

To a stirred solution of 68.8 g. (0.65 mole) of cyanogen bromide in one liter of chloroform was added 148 g. (0.56 mole) of 1-benzyl-3-benzoylpyrrolidine in 200 ml. of chloroform over a period of five hours. After the addition was complete, the solution was refluxed for one hour and then the solvent was evaporated at reduced pressure. The residual oil was treated with 1600 ml. of 4 N HCl and refluxed for 16 hours. The mixture was cooled and extracted with ether. The aqueous layer was treated with NaOH and then extracted with chloroform. The chloroform was evaporated and the residual oil which crystallized on cooling was recrystallized from ethyl acetate using charcoal. The product weighed 57 g. (58% yield). The material melted at 127.5–128.5° C. after it was recrystallized from ethyl acetate.

*Analysis.*—Calculated for $C_{12}H_{14}N_2O_2$: C, 66.03; H, 6.46; N, 12.83. Found: C, 65.83; H, 6.48; N, 12.71.

EXAMPLE 5

1-carbamoyl-3-(p-fluorobenzoyl)-pyrrolidine

To a stirred solution of 44.6 g. (0.43 mole) of cyanogen bromide in 400 ml. of chloroform was added 95 g. (0.33 mole) of 1-benzyl-3-(p-fluorobenzoyl)-pyrrolidine in 100 ml. of chloroform over a period of five hours. After the addition was complete, the solution was refluxed for 1.5 hours and then the solvent was evaporated at reduced pressure. The residual oil was treated with 1600 ml. of 4 N HCl and refluxed for 16 hours. The mixture was cooled and extracted with ether. The aqueous layer was made basic with NaOH and then extracted with chloroform. The chloroform was evaporated and the residual oil crystallized on cooling. The crystalline product weighed 32 g. (41% yield) after it was titurated with ethyl acetate and dried. The product was recrystallized from ethyl acetate-ethanol and the white crystalline material melted at 136.5–137.5° C.

*Analysis.*—Calculated for $C_{12}H_{13}FN_2O_2$: C, 61.01; H, 5.54; N, 11.86. Found: C, 61.09; H, 5.41; N, 11.61.

EXAMPLE 6

1-carbamoyl-3-(m-trifluoromethylbenzoyl)-pyrrolidine

A mixture of 1.0 g. (0.004 mole) of 3-(m-trifluoromethylbenzoyl)-pyrrolidine, 0.51 g. (0.005 mole) of nitrourea and 25 ml. of 95% ethanol was heated at about 60° C. until the evolution of gas ceased. After the solvent was evaporated the residue which crystallized on cooling was recrystallized from an ethyl acetate-isopropyl ether mixture. The white product melted at 130–131.5° C. and weighed 0.4 g. (35% yield).

*Analysis.*—Calculated for $C_{13}H_{13}F_3N_2O_2$: C, 54.55; H, 4.58; N, 9.79. Found: C, 54.33; H, 4.56; N, 9.65.

EXAMPLE 7

3-benzoylpyrrolidine hydrochloride hydrate

A solution of 18 g. of 3-benzoyl-1-carbamoylpyrrolidine in 120 ml. of concentrated HCl was refluxed three days, cooled and made basic with 50% NaOH. The oil which separated was extracted with benzene and the combined extracts were washed with water, dried over magnesium sulfate and the solvent evaporated. The residual oil weighed 8.1 g. (53% yield). A portion of the free base (5.0 g.) was dissolved in isopropanol and treated with ethereal HCl. The salt which formed was recrystallized from an isopropanol-ether mixture. The product weighed 2.5 g. and melted at 59–61° C.

*Analysis.*—Calculated for $C_{11}H_{16}NO_2Cl$: C, 57.51; H, 7.02; N, 6.10. Found: C, 57.73; H, 6.80; N, 6.22.

EXAMPLE 8

3-(p-fluorobenzoyl)-pyrrolidine oxalate

A mixture of 50 g. of 1-carbamoyl-3-(p-fluorobenzoyl)-pyrrolidine in 400 ml. of conc. HCl was refluxed three days, cooled and made basic with 50% NaOH. The oil which separated was extracted with benzene and the combined extracts were washed with water, dried over magnesium sulfate and the solvent evaporated. The residual oil weighed 19.0 g. (46% yield). A portion (1.9 g., 0.01 mole) of the free base was dissolved in isopropanol and treated with 1.3 g. (0.01 mole) of oxalic acid dihydrate and heated several minutes. The crystalline salt which separated on cooling was recrystallized again from the same solvent. The salt weighed 1.8 g. and melted at 116–119° C. (rapid heating). When the salt was heated slowly it softened at 115–117° C. and melted at 120–124° C.

*Analysis.*—Calculated for $C_{13}H_{14}FNO_5$: C, 55.12; H, 4.98; N, 4.95. Found: C, 55.40; H, 5.01; N, 4.99.

EXAMPLE 9

3-(m-trifluoromethylbenzoyl)-pyrrolidine oxalate

To a stirred solution of 44.6 g. (0.043 mole) of cyanogen bromide in 400 ml. of chloroform was added over a period of four hours, 102 g. (0.31 mole) of 1-benzyl-3-(m-trifluoromethylbenzoyl)-pyrrolidine. After the addition was complete, the mixture was heated at reflux for one hour and then the solvent was evaporated at reduced pressure. An acidic solution of the residual oil in 1200 ml. of 3 N hydrochloric acid was refluxed for 24 hours. The cooled acidic solution was decanted from a dark viscous residue and made basic with 25% sodium hydroxide and the basic solution extracted with benzene. The combined extracts were washed with water, dried over magnesium sulfate and the solvent evaporated. A solution of the residual oil (24 g., 0.1 mole) in isopropyl ether was treated with a solution of 12.6 g. (0.10 mole) of oxalic acid dihydrate in methanol. The crude salt which formed was recrystallized from isopropanol yielding 7.0 g. (7% yield) of product melting at 86–87° C.

*Analysis.*—Calculated for $C_{14}H_{14}F_3NO_5$: C, 50.45; H, 4.23; N, 4.20. Found: C, 50.33; H, 4.29; N, 4.47.

Using the procedure described above, the following compounds are prepared as follows:

3-(p-chlorobenzoyl)-pyrrolidine is prepared by reacting 1-benzyl-3-(p-chlorobenzoyl)-pyrrolidine with cyanogen bromide and refluxing the product formed therewith with concentrated hydrochloric acid.

3-(p-chlorobenzoyl)-pyrrolidine is prepared by reacting 1-benzyl-3-(p-ethylbenzoyl)-pyrrolidine with cyanogen bromide and refluxing the product formed therewith with concentrated hydrochloric acid.

EXAMPLE 10

1-(N-methylcarbamoyl)-3-(m-trifluoromethylbenzoyl)-pyrrolidine

To a stirred solution of 2.0 g. (0.0082 mole) of 3-(m-trifluoromethylbenzoyl)pyrrolidine in 50 ml. of dry benzene was added slowly a solution of 0.57 g. (0.01 mole) of methyl isocyanate in 15 ml. of dry benzene. After the addition was completed, the solution was stirred for 30 minutes at room temperature. The solvent was evaporated at reduced pressure and the residual oil which crystallized on cooling was recrystallized from isopropyl ether. The white product melted at 102–103.5° C. and weighed 1.8 g. (68% yield).

*Analysis.*—Calculated for $C_{14}H_{16}N_2O_2F_3$ (percent): C, 56.00; H, 5.04; N, 9.33. Found (percent): C, 56.27; H, 5.07; N, 9.25.

Using the procedure described in Example 10, the following compounds are prepared from the stated starting materials:

1-(N-phenylcarbamoyl)-3-benzoylpyrrolidine by reacting 3-benzoylpyrrolidine and phenyl isocyanate.

1-[N-(p-tolyl)-carbamoyl]-3-benzoylpyrrolidine by reacting p-tolyl isocyanate and 3-benzoylpyrrolidine.

1 - (N-phenylcarbamoyl) - 3 - (p-fluorobenzoyl)-pyrrolidine by reacting 3-(p-fluorobenzoyl)-pyrrolidine and phenyl isocyanate.

1-[N - (m-trifluoromethylphenyl) - carbamoyl]-3-benzoylpyrrolidine by reacting 3-benzoylpyrrolidine and m-trifluoromethylphenyl isocyanate.

1-[N - (m-chlorophenyl) - carbamoyl]-3-benzoylpyrrolidine by reacting 3-benzoylpyrrolidine and m-chlorophenyl isocyanate.

EXAMPLE 11

N-cyclopentyl-N-(p-chlorophenyl)-carbamoyl chloride

N-cyclopentyl-p-chloroaniline (78.4 gms.; 0.4 mole) was added slowly with stirring to a cold (10° C.) toluene solution of 60 gms. (0.6 mole) of phosgene. The reaction mixture was stirred one and one-half hours at room temperature, then stirred at 85° C. for four hours, cooled, filtered, and the filtrate concentrated under reduced pressure to give 90 grams of crude material. The crude material was crystallized from ligroin (60–90° C.) to give 85.5 grams of white crystalline N-cyclopentyl-N-(p-chlorophenyl)-carbamoyl chloride melting at 82–85° C.

EXAMPLE 12

N-methyl-N-phenylcarbamoyl chloride

Using the method of Example 11, N-methyl-aniline was mixed and reacted with phosgene to give N-methyl-N-phenylcarbamoyl chloride melting at 85–86.5° C.

EXAMPLE 13

N-cyclopentyl-N-phenylcarbamoyl chloride

Using the method of Example 11, N - cyclopentylaniline was mixed and reacted with phosgene to give N-cyclopentyl-N-phenylcarbamoyl chloride melting at 77.5–79.5° C.

Using the procedure described in Example 11, the following compounds are prepared from the stated starting materials:

N,N-diphenylcarbamoyl chloride by reacting diphenylamine and phosgene.

N,N-di-(p-tolyl)-carbamoyl chloride by reacting di-p-tolylamine and phosgene.

N,N-diethylcarbamoyl chloride by reacting diethylamine and phosgene.

EXAMPLE 14

1-(N-cyclophentyl-N-phenylcarbamoyl)-3-benzoylpyrrolidine

To a stirred solution of 35 gms. (0.20 mole) of 3-benzoylpyrrolidine in 150 ml. of dry toluene was added dropwise a solution of 44.6 gms. (0.20 mole) of N-cyclopentyl-N-phenyl-carbamoyl chloride in 200 ml. of dry toluene. The reaction mixture was stirred at room temperature for two hours following the addition and then slowly raised to the reflux temperature where it was maintained for six hours. Following the reflux period the reaction mixture was cooled, washed with water, dried over sodium sulfate and the toluene stripped from the dry solution under reduced pressure to give the product 1 - (N-cyclopentyl-N-phenylcarbamoyl) - 3-benzolypyrrolidine as a white crystalline solid.

Using the procedure described above, the following compounds are prepared from the stated starting materials:

1-(N,N-diphenylcarbamoyl) - 3-benzoylpyrrolidine is prepared by reacting N,N-diphenylcarbamoyl chloride with 3-benzoylpyrrolidine.

1-(N,N-diphenylcarbamoyl) - 3-(p-fluorobenzoyl)-pyrrolidine is prepared by reacting N,N-diphenylcarbamoyl chloride with 3-(p-fluorobenzoyl)-pyrrolidine.

1-(N,N-diethylcarbamoyl) - 3-(p-fluorobenzoyl)-pyrrolidine is prepared by reacting N,N-diethylcarbamoyl chloride with 3-(p-fluorobenzoyl)-pyrrolidine.

1-(N,N-diethylcarbamoyl) - 3 - (p-fluorobenzoyl)-pyrrolidine is prepared by reacting N,N-diethylcarbamoyl chloride with 3-(p-fluorobenzoyl)-pyrrolidine.

1-(N-methyl-N-phenylcarbamoyl) - 3 - (m-trifluoromethylbenzoyl)-pyrrolidine is prepared by reacting N-methyl-N-phenylcarbamoyl chloride with 3-(m-trifluoromethylbenzoyl)-pyrrolidine.

1-(N - cyclopentyl-N-phenylcarbamoyl) - 3 - (m-trifluoromethylbenzoyl)-pyrrolidine is prepared by reacting N-cyclopentyl-N-phenylcarbamoyl chloride with 3-(m-trifluoromethylbenzoyl)-pyrrolidine.

Effective quantities of any of the foregoing pharmacologically active compounds may be administered to a living animal body in any one of various ways as, for example, orally as in capsules or tablets.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one-hundred milligrams. Five to fifty milligrams appear optimum per unit dose, while usual broader ranges appear to be one to 500 milligrams per unit dose. The active agents of the invention may be combined with other pharmacologically active agents, or with buffers, antacids or the like, for administration and the proportion of the active agent in the compositions may be varied widely. It is only necessary that the active ingredients constitute an effective amount, i.e., such that a suitable effective dosage will be obtained consistent with the dosage form employed.

The formulations given below are representative for the pharmacologically active compounds of the invention.

(1) Capsules

Capsules of 5 mg., 25 mg., and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) Tablets

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| | 170.1 |

Uniformly blend 1, 2, 4, and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

(A) 50 mg. tablet

| Ingredients: | Per tablet, mg. |
|---|---|
| Active ingredient | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

(B) 100 mg. tablet

| Ingredients: | Per tablet, mg. |
|---|---|
| Active ingredient | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

What is claimed is:

1. A compound selected from the group consisting of a member having the formula:

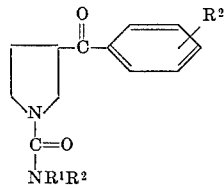

wherein;
- $R^1$ and $R^2$ are each selected from the group consisting of hydrogen, lower alkyl, lower cycloalkyl having three to nine carbon atoms inclusive, phenyl, X-phenyl, and
- $R^3$ is selected from the group consisting of hydrogen, lower alkyl, halogen having an atomic weight less than 80, and trifluoromethyl, wherein X is selected from the group consisting of from 1 to 3 of the following radicals: lower alkoxy, lower alkyl, trifluoromethyl and halogen.

2. A compound of claim 1 which is a 1-(N-lower alkylcarbamoyl)-3-benzoylpyrrolidine.

3. A compound of claim 1 which is 1-carbamoyl-3-benzoylpyrrolidine.

4. A compound of claim 1 which is 1-carbamoyl-3-(p-fluorobenzoyl)-pyrrolidine.

5. A compound of claim 1 which is 1-carbamoyl-3-(m-trifluoromethylbenzoyl)-pyrrolidine.

6. A compound of claim 1 which is 1-(N-methylcarbamoyl)-3-(m-trifluoromethylbenzoyl)-pyrrolidine.

7. A compound of claim 1 which is 1-(N-cyclopentyl-N-phenylcarbamoyl)-3-benzoylpyrrolidine.

8. A compound of claim 1 which is 1-(N-cyclopentyl-N-phenylcarbamoyl)-3-(p-fluorobenzoyl)-pyrrolidine.

References Cited

UNITED STATES PATENTS 3,318,908  5/1967  Swidinsky et al. ___ 260—326.62

ALTON D. ROLLINS, Primary Examiner
JOSE TOVAR, Assistant Examiner

U.S. Cl. X.R.
424—274